Dec. 18, 1956  F. W. WAHLIN  2,774,631
TWO-PART ORIFICE SPRAY NOZZLE AND METHOD OF MAKING SAME
Filed June 11, 1952
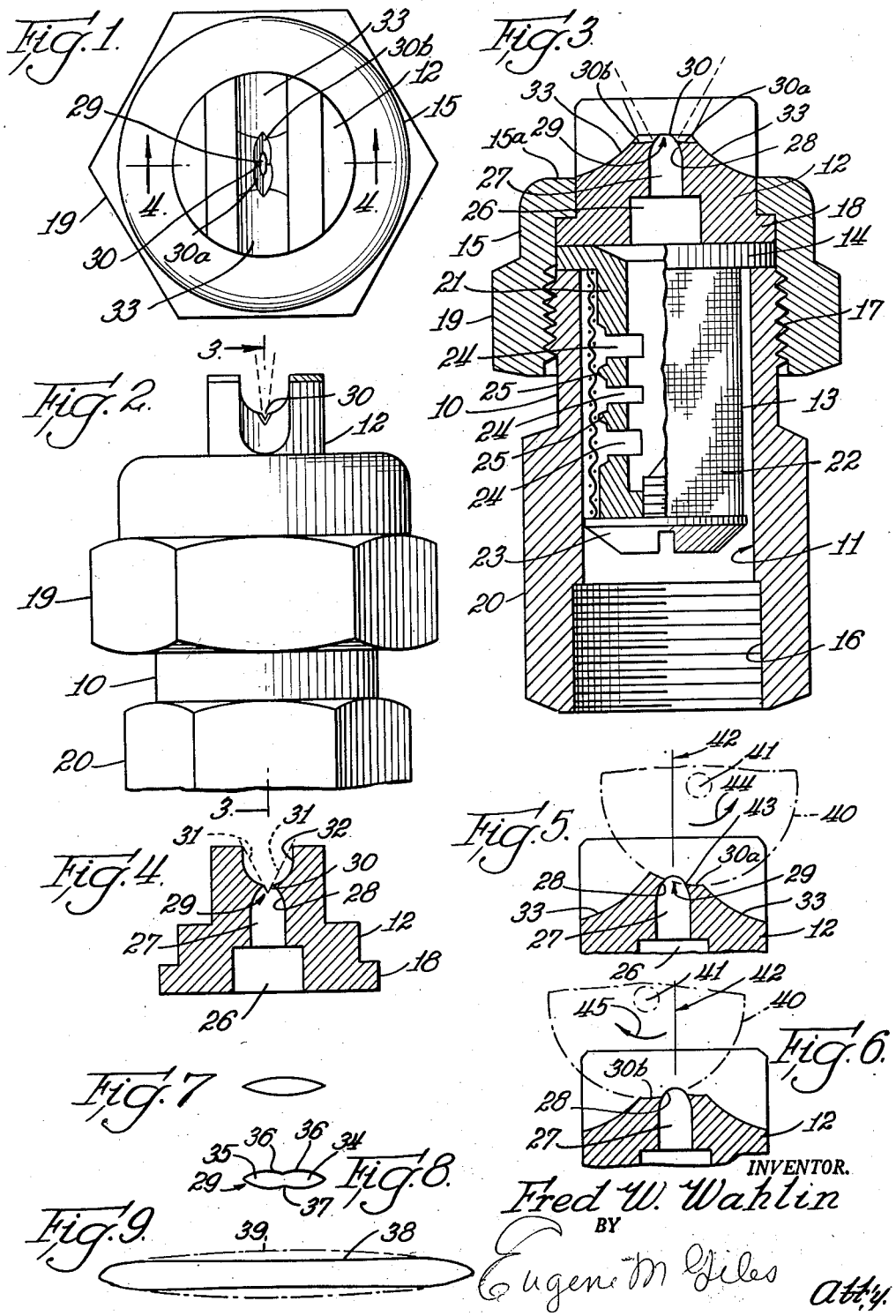

United States Patent Office 2,774,631
Patented Dec. 18, 1956

2,774,631

TWO-PART ORIFICE SPRAY NOZZLE AND METHOD OF MAKING SAME

Fred W. Wahlin, Oak Park, Ill., assignor to Spraying Systems Co., Bellwood, Ill., a corporation of Illinois Application June 11, 1952, Serial No. 292,798

8 Claims. (Cl. 299—153)

My invention relates to spray nozzles and has reference more particularly to a nozzle having a spray orifice composed of two conjoined parts and to a method of making such orifice, this application being a continuation in part of my co-pending applications Serial No. 81,288, filed March 14, 1949 (now Patent 2,621,078), and Serial No. 105,576, filed July 19, 1949 (now Patent 2,619,388); and Serial No. 104,672, filed July 14, 1949, now Patent 2,683,626.

This invention has particular applicability to spray nozzles which have a narrow elongated orifice for producing a flat fan shaped spray, although certain features thereof are applicable to nozzle orifices of other shapes.

In such fan shaped spray nozzles it is generally important to produce a spray in which the distribution of the sprayed liquid is uniform throughout the fanwise range of spray deposit, this being particularly important in field spraying and the like because of the possible deleterious effect at places which are oversprayed and lack of spray effectiveness at places which are undersprayed, both of which conditions are likely to occur if the spray nozzle fails to insure uniform spray distribution. Moreover, even and uniform spray distribution is quite important from the standpoint of cost or economy, as uneven distribution usually results in wastage of the sprayed material which is oftentimes applied extravagently to make sure of adequate coverage at all places.

Inasmuch as such fan shaped sprays are usually employed in spraying flat or relatively flat areas, such as the ground surface or vegetation thereon, the spray volume must vary along the length of the nozzle orifice to effect uniform distribution of the spray.

For example, when the nozzle is pointed so that the spray from the center part of the elongated orifice is discharged directly toward the ground, the spray from that center part spreads out fanwise to the least extent before it reaches the ground and accordingly is distributed along a relatively short portion of the length of the fanwise range of the spray deposit from the nozzle.

On the other hand, the spray from the opposite end portions of the orifice, which discharge obliquely toward the ground, necessarily spread out fanwise to a much greater extent before it reaches the ground and is distributed along a much longer portion of the fanwise range of spray deposit, and accordingly, in such nozzle, uniformity of spray distribution requires that the volume of spray be least at the center of the orifice or midway between the ends thereof, when the spray is discharged directly toward the ground, and that the volume of spray increases progressively from the orifice center to the ends of the orifice where the spray is discharged most obliquely toward the ground.

Heretofore no nozzle has been available which provides such progressively increased discharge and uniformity of spray distribution. Indeed, in accordance with the prevailing practice of making such nozzles, they generally provide fullness of spray at the orifice center.

Moreover, the orifices of such nozzles are usually made with a rotary cutter, the cutting operation of which is lengthwise of the orifice from end to end thereof, and usually leaves an objectionable burr at the beginning end of the orifice cutting.

The principal objects of my invention are, to minimize the volume of spray at a selected place between the ends of a fan shaped spray orifice; to construct the orifice with opposite end portions which progressively diminish in width toward and join one another at their inner ends; to provide an improved method of making fan shape spray orifices; and to avoid objectionable burrs in producing elongated orifices, these and other objects being accomplished as explained hereinafter and as shown in the accompanying drawing, in which Fig. 1 is a top or discharge end view of a nozzle embodying my invention;

Fig. 2 is a side view of the nozzle of Fig. 1 with a portion at the lower end of the nozzle broken away;

Fig. 3 is a sectional view of the full length of the nozzle of Figs. 1 and 2 taken on the line 3—3 of Fig. 2;

Fig. 4 is a sectional view of the nozzle tip taken on the line 4—4 of Fig. 1;

Fig. 5 is a view, in section like in Fig. 3, of a portion of the nozzle tip illustrating a step in the operation of forming the nozzle orifice;

Fig. 6 is a view similar to Fig. 5 showing another step in the operation of forming the nozzle orifice;

Fig. 7 is a view showing for comparison, the shape of the orifice generally employed in fan shape spraying;

Fig. 8 is a view showing the shape of the orifice of the nozzle of Figs. 1, 2, 3 and 4; and Fig. 9 is a view showing comparatively the spray deposit patterns of the orifices of Figs. 7 and 8.

Referring to the drawing, the nozzle assembly shown therein is of conventional type composing a body 10 having a large cylindrical opening 11 therethrough, a flat sided nozzle tip 12 which is made as a separate part and secured to the outer end of the body 10, a strainer 13 in the cylindrical opening 11 of the body and having an annular flange 14 at the outer end thereof interposed between the nozzle tip 12 and the outer end of the body 10, and a clamping member 15 by which the nozzle tip 12 is secured to the body 10.

The body 10 is internally threaded at 16 at its end remote from the tip 12 for connection to a pipe or other means through which liquid is supplied to the nozzle and the other end of the body is externally threaded at 17 for threaded connection therewith of the clamping member 15 which is of collar nut type with the outer end of the collar turned in as at 15ª to engage over an annular flange 18 at the base of the nozzle tip for clamping the latter against the outer end of the strainer 13 and the strainer flange 14 against the outer end of the nozzle body. The clamping member 15 and body 10 each have a portion of the length thereof of external hexagonal form as indicated at 19 and 20 respectively, or of other suitable form for wrench engagement for conveniently securing the parts together.

The illustrated strainer 13 has a hollow cylindrical body 21 surrounded by a cylindrical screen 22 which is secured thereon by a screw 23 which is threaded into the lower end of the strainer body 21 and had a large head against which the lower end of the screen 22 abuts. The strainer body 21 has a series of transverse slots 24 through its wall, preferably at several places therearound, for example at diametrically opposed sides thereof, so that liquid introduced through the lower end of the nozzle passes through the screen into the interior of the strainer body 21, and the body 21 in the vicinity of said slots preferably is turned down to a size smaller than the interior of the screen 22 but with annular screen contacting ribs 25 left at suitable intervals, so as to allow free flow of liquid through a considerable area of the screen to the slots 24.

The nozzle tip 12 has a bored out cavity 26 communicating with the interior of the strainer body 21 and leading to a relatively small diameter bore 27 with rounded or dome shaped outer end 28 through which the spray orifice 29 is formed.

This orifice is formed by cutting a groove 30 in the end of the nozzle tip 12 so that it cuts through and intersects the rounded outer end 28 of the nozzle chamber or passage 27, an acutely angled V-shaped rotary cutter being generally employed, sometimes with the edge extremity rounded, to form the groove 30 which heretofore was usually of a shape similar to that indicated in Fig. 7.

In practice it has been customary in nozzles of the type to which this invention relates, to recess the orifice quite deeply in the end of the nozzle or nozzle tip and to provide extensions at the opposite sides of the orifice 29 for protection thereof, and until the invention of my above mentioned application Serial No. 81,288 a deep V-shaped groove, such as indicated by dotted lines at 31 in Fig. 4, of the same V-shaped angularity as that immediately at the orifice, was generally employed for the purpose.

Preferably, however, I employ for the orifice protecting groove, a relatively wide round bottom groove such as indicated at 32, with a shallow V-shaped grooving 30 in the bottom thereof to produce the orifice 29.

Also, I prefer to slope the opposite end portions of the groove 32 abruptly downward immediately beyond the opposite ends of the orifice 29 as indicated at 33, although it is to be understood that the purpose of the present invention may be accomplished without deeply recessing the orifice 29 and without the preferred form 32 of protective groove or without sloping the ends of the protective groove downwardly.

It is an important feature of the present invention however, that the orifice 29 is shaped so that the opposite end portions thereof progressively diminish in width toward and join one another, as indicated in Fig. 8 so that the volume of discharge is diminished at the selected place between the orifice ends.

The opposite end portions of the orifice are indicated respectively at 34 and 35 in Fig. 8 and it will be observed that these end portions progressively diminish in width toward one another, as indicated at 36, to the place 37 where they join one another and thus conjointly form the orifice 29.

Generally the selected place 37 of diminished discharge would be midway between the ends of the orifice as shown in Fig. 8, but it may be nearer one end than the other, if desired, and may be quite readily made, as hereinafter explained, either with the place 37 of junction and diminished width equally or unequally distant from the opposite ends of the orifice.

By reason of the centrally diminished width, as shown in Fig. 8, the volume of orifice discharge progressively decreases inwardly at the places 36 of diminishing width, to the place 37 of juncture of the two orifice end portions 34 and 35, and when a nozzle having such orifice is employed in the manner indicated in the example of ground spraying that is given above, with the center place 37 of the orifice discharging directly or perpendicularly toward the ground, the volume of spray discharged at the center of the orifice directly toward the ground is lessened and progressively increases fanwise therefrom as the obliquity of the spray increases so that the volume of spray at each place throughout the length of the orifice is quite closely proportioned to the fanwise length of ground coverage supplied therefrom.

Thus the volume of spray deposit is substantially uniform throughout the fanwise range thereof as indicated by the full lines 38 in Fig. 9, whereas with the conventional fan shape spray orifice, similar to that shown in Fig. 7, the spray deposit is greater midway between the ends of the fanwise range thereof and diminishes therefrom toward the ends of the deposit range as indicated by dotted lines at 39 in Fig. 9.

For making this orifice 29 of diminished width between the ends, a rotary cutter, such as indicated by dotted lines at 40 in Figs. 5 and 6 is preferably employed, having an acutely angled V-edge of the angularity or taper of the cross section of the groove 30 required for forming the orifice, and first one of the portions, for example the portion 34 of the orifice 29, is formed by cutting one end portion 30[a] of the groove 30 with the center 41 of the cutter 40 spaced laterally at one side of the axis 42 of the nozzle tip chamber or passage 42, as indicated in Fig. 5, and thereafter the other portion 35 of the orifice 29 is formed by cutting the other end portion 30[b] of the groove 30 with the cutter center 41 spaced laterally at the other side of said axis 42, both groove portions 30[a] and 30[b] being cut in the same plane so that they meet at their inner ends and form a continuous orifice 29 across the rounded end 28 of the chamber or passage 27.

Thus the groove portion 30[a] and 30[b] slope oppositely upward to their place of juncture with one another, and because of this slope and the rounded contour of the end 28 of the chamber or passage 27, each groove portion 30[a] and 30[b] produces an opening of somewhat elliptical shape, as indicated at 34 and 35 in Fig. 8, with the inner ends thereof converging to the junction with one another, at 37 in Fig. 8, so that the orifice 29 produced by the two aforesaid cutter operations progressively diminishes in width at opposite sides of and toward the center thereof.

Obviously the cutter 40 may be rounded at the edge extremity and the opposite sides may have some curvature in a radial plane so that the groove portions 30[a] and 30[b] are not exactly acute angled in cross section.

Moreover separate cutters 40 of slightly different shapes may be employed for cutting the grooves 30[a] and 30[b] to give a different spray distribution, and also the grooves 30[a] and 30[b] may be made with the cutter center 41 unequally spaced from the axis 42 of the chamber or passage 27.

It is furthermore an important feature of the invention that the cutter in each of the aforesaid operations of cutting the grooves 30[a] and 30[b], be rotated to cut outwardly toward the outer end of the respective groove 30[a] and 30[b], as such cutters have a tendency to leave an objectionable burr at the entering end of the opening made thereby.

Thus for example, if the cutter 40 in the Fig. 5 operation were rotated in clockwise direction it would have a tendency to leave a burr at the outer end 43 of the opening cut thereby into the rounded end 28 of the chamber or passage 27.

Accordingly in the operation of Fig. 5 the cutter 40 is rotated in a counterclockwise direction, as indicated by the arrow 44, and in the operation of Fig. 6 the cutter 40 is operated in a clockwise direction as indicated by the arrow 45, thereby avoiding any burrs at the outer ends of the orifice 29.

While I have shown and described my invention in a preferred form, I am aware that various changes and modifications may be made therein without departing from the principles of the invention, the scope of which is to be determined by the appended claims.

What I claim is:

1. A spray nozzle having a passage therein with a dome shaped end which is concentric with and has the summit thereof concentric with the axis of said passage, said nozzle having at said passage end a spray orifice which is elongated in a direction leading across the summit of said dome shaped end and opens outwardly from said dome shaped end of the passage to the exterior of the nozzle, said orifice being elevationally contoured in conformity to said dome shaped end and having portions of the length thereof which slope downwardly from an interposed place of narrower orifice width to respective places of greater orifice width which face outwardly from the nozzle respectively in directions away from one another.

2. A spray nozzle having a passage therein with a dome shaped end which is concentric with and has the summit thereof concentric with the axis of said passage, said nozzle having at said passage end a spray orifice which is elongated in a direction leading across the summit of said dome shaped end and opens outwardly from said dome shaped end of the passage to the exterior of the nozzle, said orifice being elevationally contoured in conformity to said dome shaped end and having portions of the length thereof which slope downwardly at opposite sides respectively of said dome shaped end from an interposed place of narrower orifice width to respective places of greater orifice width which face outwardly from the nozzle respectively in directions away from one another.

3. A spray nozzle having a passage therein with a dome shaped end which is concentric with and has the summit thereof concentric with the axis of said passage, said nozzle having at said passage end a spray orifice which is elongated in a direction leading across the summit of said dome shaped end and opens outwardly from said dome shaped end of the passage to the exterior of the nozzle, said orifice being elevationally contoured in conformity to said dome shaped end and having adjoining portions of the length thereof which slope oppositely downward from a place of narrower orifice width to respective places of greater orifice width which face outwardly from the nozzle respectively in directions away from one another.

4. A spray nozzle having a passage therein with a dome shaped end which is concentric with and has the summit thereof concentric with the axis of said passage, said nozzle having at said passage end a spray orifice which is elongated in a direction leading across the summit of said dome shaped end and opens outwardly from said dome shaped end of the passage to the exterior of the nozzle, said orifice being elevationally contoured in conformity to said dome shaped end and having portions of the length thereof which progressively increase in width in a direction away from one another and slope downwardly at opposite sides respectively of said dome shaped end in the direction of progressive increase in width from an interposed place of narrower orifice width to respective places of greater orifice width which face outwardly from the nozzle respectively in directions away from one another.

5. A spray nozzle having a passage therein with a dome shaped end which is concentric with and has the summit thereof concentric with the axis of said passage, said nozzle having at said passage end a spray orifice which is elongated in a direction leading across the summit of said dome shaped end and opens outwardly from said dome shaped end of the passage to the exterior of the nozzle, said orifice being elevationally contoured in conformity to said dome shaped end and having portions of the length thereof which slope downwardly from an interposed place of narrower orifice width to respective places of greater orifice width which face outwardly from the nozzle respectively in directions away from one another, said nozzle having two coplanar grooves which extend inward toward one another at opposite sides respectively of and intersect said dome shaped end and said orifice being at the place of intersection of said grooves with said dome shaped end.

6. The method of making a spray nozzle with an elongated spray discharge orifice leading from the interior to the exterior of the nozzle, which said method comprises, mutually intersecting an internal cavity and an external groove at an end portion of the nozzle to form at the place of intersection thereof an elongated orifice with opposite end portions thereof each tapered reversely to the other toward its respective orifice end, and then internally widening one of said end portions of the thus formed orifice at a place where that one of said end portions is tapered toward its respective orifice end and reshaping it at that place to taper toward the other orifice end.

7. The method of making a spray nozzle with an elongated spray discharge orifice leading from the interior to the exterior of the nozzle, which said method comprises, mutually intersecting an internal cavity and an external groove at an end portion of the nozzle to form at the place of intersection thereof an elongated orifice with opposite end portions thereof each tapered reversely to the other toward its respective orifice end, and then internally widening one of said end portions of the thus formed orifice at a place where that one of said end portions is tapered toward its respective orifice end and reshaping it at that place to taper toward the other orifice end, and simultaneously with the aforesaid widening and reshaping of the said one of said end portions, increasing the length of the orifice at the respective orifice end of that end portion.

8. The method of making a spray nozzle with an elongated spray discharge orifice which has a place of reduced width between the ends thereof and leads from the interior of the nozzle to the exterior thereof, which said method comprises providing an end part of the nozzle with a passage therein which has a dome shaped end, then cutting in the exterior of said part a groove which intersects said dome shaped end at one side thereof and forms at the place of such intersection an elongated portion of the length of said orifice with at least one substantially V-shaped end, then cutting in the exterior of said part another groove which is coplanar with the first mentioned groove and intersects said dome shaped end at the opposite side thereof and forms at its place of intersection with said dome shaped end another elongated portion of the length of said orifice having at least one substantially V-shaped end intersecting the said V-shaped end of the aforesaid first made portion of the length of the orifice at a place where the width of the last mentioned V-shaped end is less than the maximum width thereof.

References Cited in the file of this patent

UNITED STATES PATENTS

| D. 134,562 | Murphy | Dec. 15, 1942 |
| 1,310,733 | Bore et al. | July 22, 1919 |
| 1,813,733 | Freeman | July 7, 1931 |
| 2,477,607 | Hungate | Aug. 2, 1949 |
| 2,619,388 | Wahlin | Nov. 25, 1952 |
| 2,621,078 | Wahlin | Dec. 9, 1952 |
| 2,641,509 | Yost | June 9, 1953 |
| 2,683,626 | Wahlin | July 13, 1954 |

FOREIGN PATENTS

| 737,521 | France | Oct. 14, 1932 |